US009080859B2

(12) United States Patent
Oshima et al.

(10) Patent No.: US 9,080,859 B2
(45) Date of Patent: Jul. 14, 2015

(54) SHAPE MEASURING APPARATUS AND ROBOT APPARATUS INCLUDING THE SAME

(75) Inventors: Mikio Oshima, Kitakyushu (JP); Mitsuhiro Matsuzaki, Kitakyushu (JP); Hiroyuki Maezawa, Kitakyushu (JP)

(73) Assignee: KABUSHIKI KAISHA YASKAWA DENKI, Kitakyishu-Shi (JP)

( * ) Notice: Subject to any disclaimer, the term of this patent is extended or adjusted under 35 U.S.C. 154(b) by 1072 days.

(21) Appl. No.: 12/875,098

(22) Filed: Sep. 2, 2010

(65) Prior Publication Data

US 2010/0329832 A1    Dec. 30, 2010

Related U.S. Application Data

(63) Continuation of application No. PCT/JP2009/055097, filed on Mar. 17, 2009.

(30) Foreign Application Priority Data

Mar. 19, 2008    (JP) .................................. 2008-072318

(51) Int. Cl.
    *G01B 11/24*    (2006.01)
    *B25J 15/00*    (2006.01)

(52) U.S. Cl.
    CPC .............. *G01B 11/24* (2013.01); *B25J 15/0019* (2013.01); *Y10T 74/20305* (2015.01)

(58) Field of Classification Search
    CPC .................. G01B 11/24; G01B 11/25; G02B 2006/12121
    USPC ......... 361/679.1, 688–695; 356/601
    See application file for complete search history.

(56) References Cited

U.S. PATENT DOCUMENTS 4,142,702 A * 3/1979 Lamboo .................... 248/174
4,300,836 A * 11/1981 Holmes et al. ............. 356/601

(Continued)

FOREIGN PATENT DOCUMENTS

JP    7-022872 B2    4/1991
JP    06-302000      10/1994

(Continued)

OTHER PUBLICATIONS

Laser Energetics Jan. 6, 2009 http://www.laserenergetics.com/products_lasere.htm.*
Japanese Office Action for corresponding JP Application No. 2010-503870, May 14, 2013.

(Continued)

*Primary Examiner* — Michael A Lyons
*Assistant Examiner* — Maurice Smith
(74) *Attorney, Agent, or Firm* — Mori & Ward, LLP

(57) ABSTRACT

A housing including a base and cover has an open space that is open to the atmosphere and a closed space that is closed to the atmosphere. The open space contains a laser having a low operating temperature. The closed space contains a heat generating element and the like, which have higher operating temperatures than the laser. The heat generating element is in close contact with the base, which also serves as a heatsink, so that the heat generating element is cooled. Most parts of a motor, which is a heat generating member, are disposed in the closed space. A fan is diagonally disposed with respect to side surfaces of the heat generating element, which has a rectangular shape and flat side surfaces, so as to efficiently blow air toward the heat generating element disposed in the closed space.

14 Claims, 5 Drawing Sheets

(56) References Cited

U.S. PATENT DOCUMENTS

| | | | | |
|---|---|---|---|---|
| 4,623,183 | A | * | 11/1986 | Aomori ................ 294/86.4 |
| 4,726,032 | A | * | 2/1988 | Hoag ..................... 372/106 |
| 4,800,401 | A | * | 1/1989 | Sato et al. ............... 347/242 |
| 5,198,877 | A | * | 3/1993 | Schulz ................... 356/614 |
| 5,343,029 | A | * | 8/1994 | Katoh et al. .......... 235/462.39 |
| 5,615,085 | A | * | 3/1997 | Wakabayashi et al. ...... 361/702 |
| 5,666,450 | A | * | 9/1997 | Fujimura et al. ............ 385/93 |
| 5,790,379 | A | * | 8/1998 | Kang ..................... 361/719 |
| 6,542,249 | B1 | * | 4/2003 | Kofman et al. ............ 356/601 |
| 6,611,617 | B1 | * | 8/2003 | Crampton ................. 382/154 |
| 7,173,951 | B2 | * | 2/2007 | Shinohara et al. ........... 372/36 |
| 7,181,876 | B1 | * | 2/2007 | Ahmadi ................... 40/572 |
| 2003/0128513 | A1 | * | 7/2003 | Wiley .................... 361/695 |
| 2007/0157490 | A1 | * | 7/2007 | Vanneman et al. ........... 37/241 |

FOREIGN PATENT DOCUMENTS

| | | |
|---|---|---|
| JP | 6-302000 | 10/1994 |
| JP | 8-102180 | 4/1996 |
| JP | 8-233535 | 9/1996 |
| JP | 08-233535 | 9/1996 |
| JP | 11-509928 | 8/1999 |
| JP | 11-245442 | 9/1999 |
| JP | 2000-137183 | 5/2000 |
| JP | 2004-271404 | 9/2004 |
| WO | WO 97/05449 | 2/1997 |

OTHER PUBLICATIONS

International Search Report for International Application No. PCT/JP2009/055097, Jun. 9, 2009.

Written Opinion of the International Searching Authority for International Application No. PCT/JP2009/055097, Jun. 9, 2009.

* cited by examiner

SHAPE MEASURING APPARATUS AND ROBOT APPARATUS INCLUDING THE SAME

CROSS-REFERENCE TO RELATED APPLICATION

The present application is a continuation application of PCT/JP2009/055097, filed Mar. 17, 2009, which claims priority to Japanese Patent Application No. 2008-072318, filed Mar. 19, 2008. The contents of the se applications are incorporated herein by reference in their entirety.

BACKGROUND OF THE INVENTION

1. Field of the Invention

The present invention relates to a shape measuring apparatus and a robot apparatus.

2. Description of the Related Art

Shape measuring apparatuses used at production sites in which dust and particulates are present have closed structures, because dust may enter the shape measuring apparatuses and may cause short circuits between components mounted on a circuit board. Because heat accumulates in a closed structure, a unit having a closed structure tends to have a large size. Therefore, various attempts have been made to provide a small closed structure.

Examples of existing technologies related to the structure of a unit for containing a circuit board, a motor, and the like include an optical disc subsystem described in Japanese Unexamined Patent Application Publication No. 8-102180 laid open on Apr. 16, 1996. The optical disc apparatus includes a heat generating member that is exposed to the outside so as to provide a closed structure while suppressing an increase in the temperature of the inside of the unit.

SUMMARY OF THE INVENTION

According to a first aspect of the present invention, a shape measuring apparatus includes a housing including a base and a cover; and a laser that emits a laser beam, wherein the housing has an open space that is open to the atmosphere and a closed space that is closed to the atmosphere, wherein the open space contains the laser, and wherein the closed space contains a substrate, a heat generating element mounted on the substrate, a heat conducting sheet that transfers heat generated by the heat generating element to the base, a rotatable mirror that reflects the laser beam, a mirror shaft that supports the mirror, a lens and a camera that detect a shape of an object irradiated with the laser beam emitted from the mirror, and a fan that cools contents in the housing.

According to a second aspect of the present invention, a robot apparatus includes a robot apparatus includes a fixed unit; a movable unit disposed on the fixed unit; and a shape measuring apparatus including a housing including a base and a cover, and a laser that emits a laser beam, wherein the housing has an open space that is open to the atmosphere and a closed space that is closed to the atmosphere, wherein the open space contains the laser, and wherein the closed space contains a substrate, a heat generating element mounted on the substrate, a heat conducting sheet that transfers heat generated by the heat generating element to the base, a rotatable mirror that reflects the laser beam, a mirror shaft that supports the mirror, a lens and a camera that detect a shape of an object irradiated with the laser beam emitted from the mirror, and a fan that cools contents in the housing.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 1:
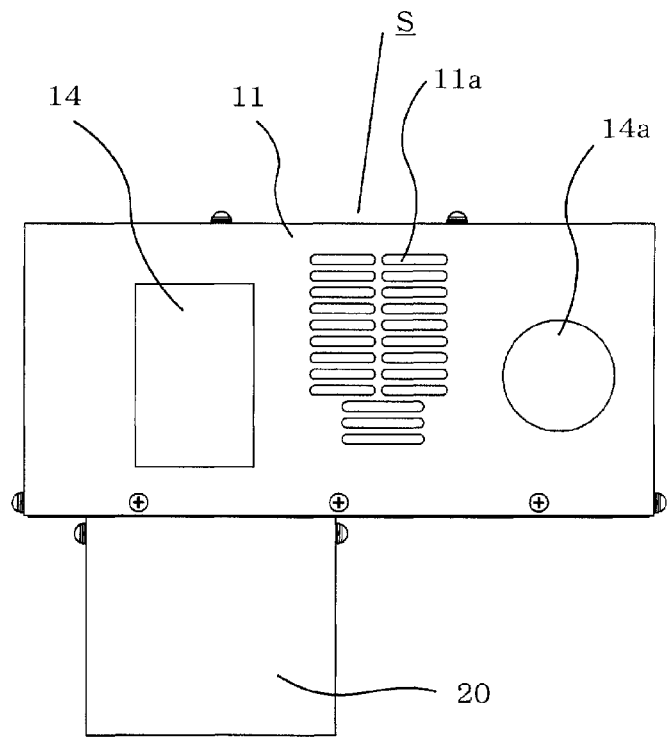
FIG. 1 is a front view of a shape measuring apparatus according to a first embodiment of the present invention.
Figure 2:
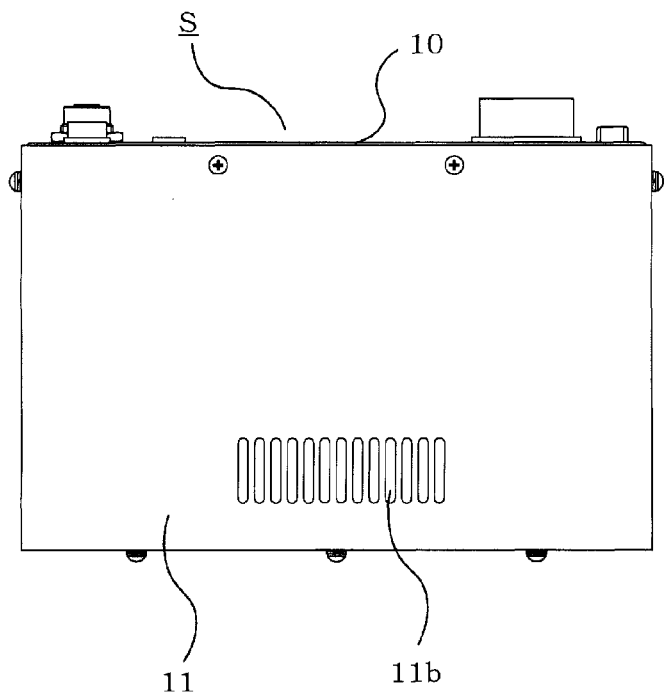
FIG. 2 is a plan view of the shape measuring apparatus of FIG. 1.
Figure 3:
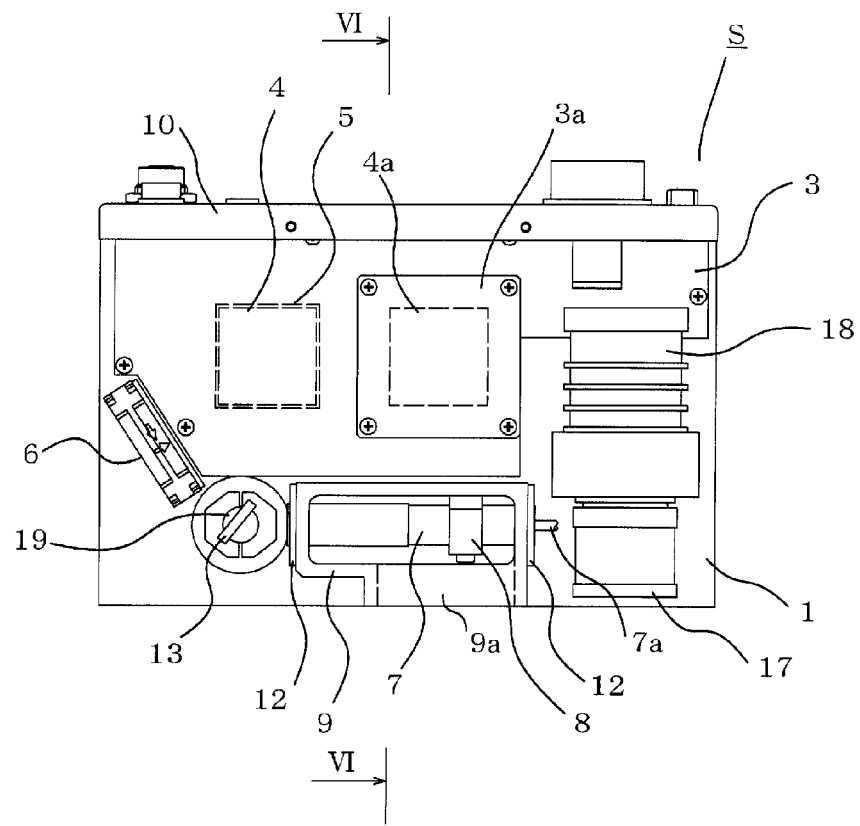
FIG. 3 is a plan view of the shape measuring apparatus of FIG. 2 from which a cover is removed.
Figure 4:
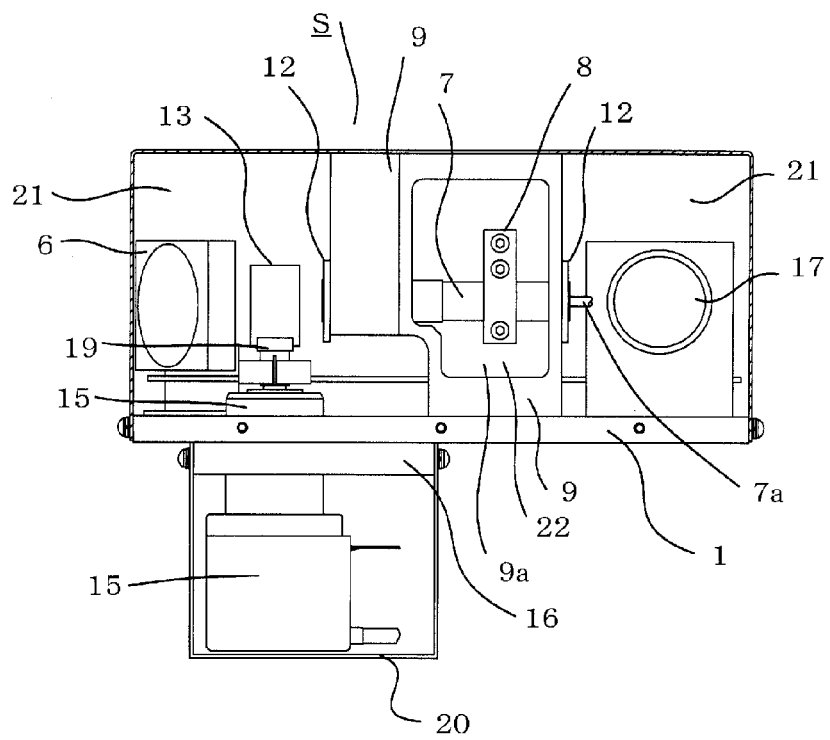
FIG. 4 is a front view of the shape measuring apparatus of FIG. 1, in which the cover and a motor cover is cut to illustrate an internal structure.
Figure 5:
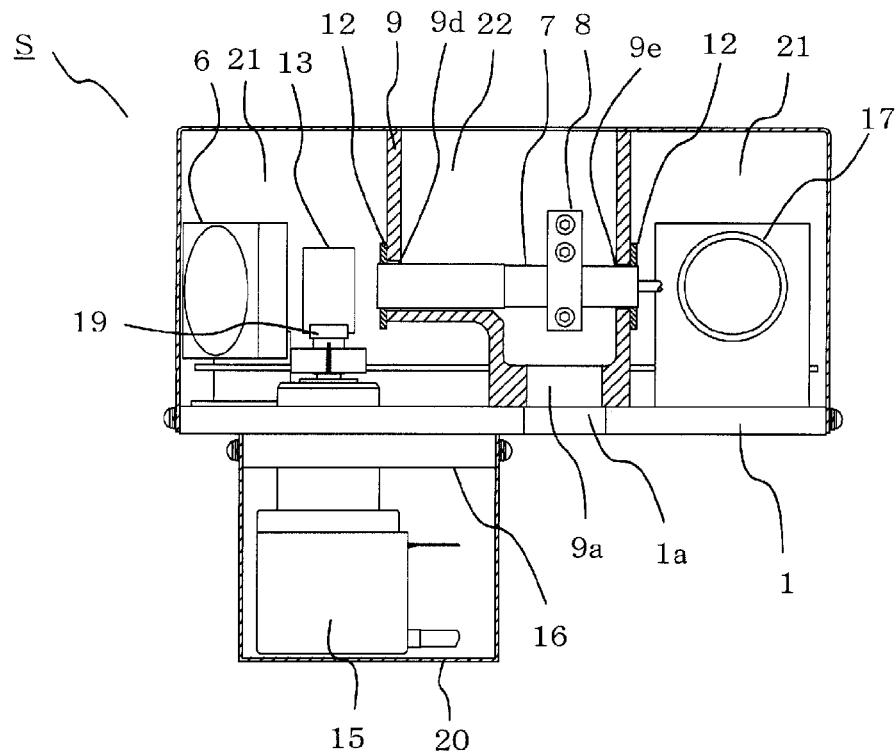
FIG. 5 is a front view of FIG. 4, in which a laser box is cut to illustrate an internal structure.
Figure 6:
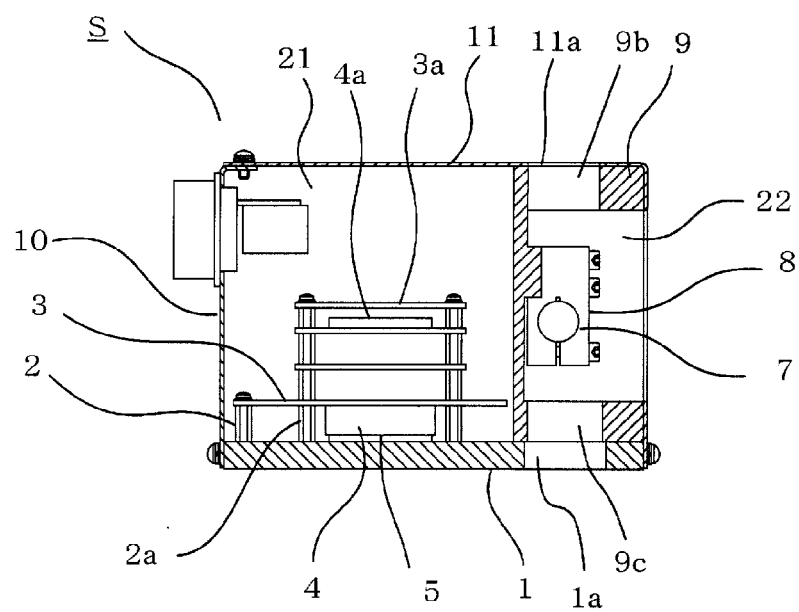
FIG. 6 is a sectional view taken along line VI-VI of FIG. 3.

Hereinafter, embodiments of the present invention will be described with reference to the drawings.

First Embodiment

FIGS. 1 to 6 illustrate a shape measuring apparatus according to a first embodiment of the present invention.

In FIGS. 1 to 6, a shape measuring apparatus S, a base 1, a vent hole 1a, studs 2 and 2a, substrates 3 and 3a, heat generating elements 4 and 4a, a heat conducting sheet 5, a fan 6, a laser 7, a cable 7a, a laser holder 8, a laser box 9, an opening 9a, vent holes 9b and 9c, laser attachment holes 9d and 9e, a connector plate 10, a cover 11, vent holes 11a and 11b, a packing 12, a mirror 13, acrylic plates 14 and 14a, a motor 15, a motor base 16, a lens 17, a camera 18, a mirror shaft 19, a motor cover 20, a closed space 21, and an open space 22 are illustrated.

The substrate 3 is attached to the base 1 with the studs 2 therebetween. The heat generating element 4, which is mounted on the substrate 3, is disposed between the base 1 and the substrate 3. The heat generating element 4 is in close contact with the base 1 with the heat conducting sheet 5 therebetween. The heat generating element 4 is in close contact with the base 1 and cooled by dissipating heat to the base 1, which also serves as a heatsink. The substrates 3a are stacked on the substrate 3 with the studs 2a therebetween. The heat generating element 4a is mounted on one of the substrates 3a. The fan 6 is disposed diagonally on the base 1 so as to cool the heat generating element 4a and prevent an increase in the temperature of a part of the closed space 21. That is, the heat generating elements 4 and 4a have rectangular shapes with flat side surfaces, and the fan 6 is diagonally disposed on the base 1 so as to blow air at an angle toward the side surfaces of the heat generating elements 4 and 4a.

The laser 7 is clamped by the laser holder 8 and attached to the laser attachment holes 9d and 9e in the laser box 9. Therefore, the laser 7 can be securely positioned and fixed when the laser 7 is attached. The laser box 9 has the open space 22, which contains the laser 7, the opening 9a, which is connected to the open space 22 through the front side, the vent hole 9b, which is connected to the open space 22 through the upper side, and the vent hole 9c, which is connected to the open space 22 through the lower side. The laser holder 8 is disposed so as to face the opening 9a, so that the laser 7 can be easily attached. The lower surface of the laser box 9 is attached to the base 1. The base 1 has the vent hole 1a formed in a portion that is in contact with the vent hole 9c in the laser box 9. The vent hole 1a has the same size or substantially the same size as the vent hole 9c. The connector plate 10 is attached to an end surface of the base 1 opposite the side on which the laser box 9 is disposed. The cover 11, which covers the entire apparatus, is in close contact with the base 1, the connector plate 10, and the laser box 9. The cover 11 has the vent holes 11a and 11b, which have circular or elongated circular shapes, in a portion of the cover 11 that is in contact with the vent holes 9b and 9c in the laser box 9, which is in close contact with the cover 11. The laser 7 is fitted into the laser attachment holes 9d and 9e that are formed in the laser box 9. The gap is sealed with the packing 12.

Using the shape measuring apparatus S having the structure described above, the shape of an object is measured as follows.

The object to be measured is placed in front of the lens 17 with the acrylic plate 14a therebetween. In this case, the object to be measured may be placed, for example, on a measuring stage that is fixed or on a conveyer that is moving.

The laser 7 emits a laser beam. The laser beam is reflected by the mirror 13, passes through the acrylic plate 14 attached to the cover 11, and is incident on the object to be measured. The mirror 13 is rotated by the motor 15 so as to irradiate the object to be measured with the laser beam. The motor 15 is attached to the base 1 with the motor base 16 therebetween. The laser beam, with which the object has been irradiated, passes through the acrylic plate 14a attached to the cover 11, passes through the lens 17, and is detected by the camera 18. The mirror 13 is bonded to the mirror shaft 19 and attached to an output shaft of the motor 15. The motor 15 is covered with the motor cover 20 that is fitted to the motor base 16.

The substrates 3 and 3a, which are attached to the base 1, the mirror 13, the lens 17, the camera 18, and the like are disposed in the closed space 21, which is formed by the base 1, the connector plate 10, the laser box 9, and the cover 11. Thus, entry of dust and particulates from the outside is prevented. Most parts of the motor 15 are disposed outside the closed space 21, so that an increase in the temperature of the closed space 21 due to heat generated by the motor 15 can be suppressed.

The laser 7 has a low operating temperature. Therefore, if the laser 7 were disposed in the closed space 21, the temperature of the laser would exceed the operating temperature. The body of the laser 7, excluding the distal end portion from which a laser beam is emitted and a proximal end portion from which a cable extends, is disposed in the open space 22 of the laser box 9. The front side, the upper side, and the lower side of the laser 7 are open spaces, so that outside air flows into the open spaces and the ambient temperature of the laser 7 is approximately the same as the temperature of outside air. Therefore, the laser 7 is not used above the operating temperature. When the laser 7 generates heat, the laser 7 is cooled by outside air, which has a temperature lower than that of the laser, so that the heat is not transferred to the closed space 21.

With such a structure, the space containing the mirror, the substrate, and the like is closed, so that dust and particulates do not enter the space. Thus, the mirror is not covered with dust, the life of the fan is increased, and short circuits on the substrate and the like can be prevented. It is not necessary to lower the operating temperature of the unit in order to use a laser having a low operating temperature.

Second Embodiment

The shape measuring apparatus S according to the first embodiment can be mounted on a robot apparatus R and used.

Figure 7:
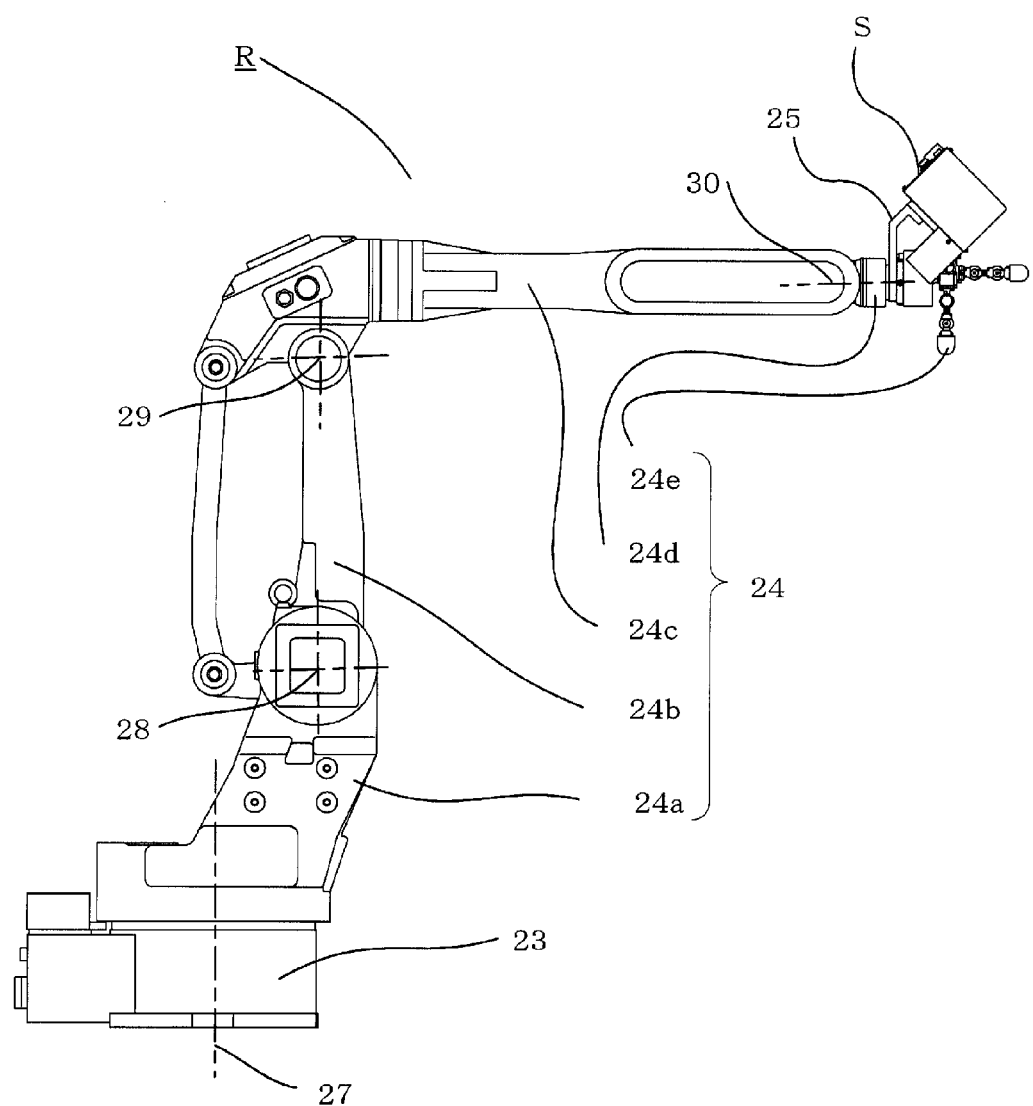
FIG. 7 is a side view of a robot apparatus according to a second embodiment of the present invention, which includes the shape measuring apparatus according to the first embodiment.
Figure 8:
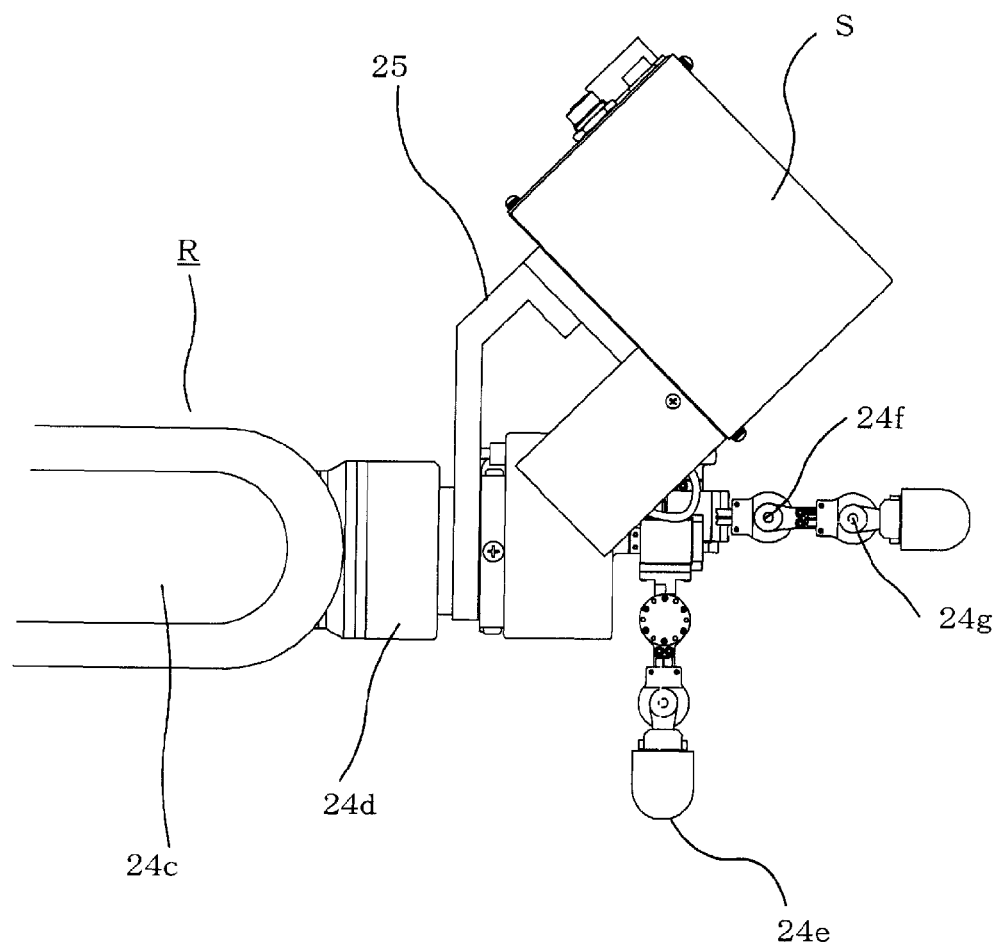
FIG. 8 is an enlarged view of a region surrounding a wrist of the robot apparatus of FIG. 7.

As illustrated in FIGS. 7 and 8, the robot apparatus R, for example, includes a fixed unit 23 and a movable unit 24.

The fixed unit 23 includes, for example, a fixed base. The movable unit 24, for example, includes a rotating base 24a that is connected to the fixed unit 23 so as to be rotatable around an axis 27, a vertical arm 24b connected to the rotating base 24a so as to be rotatable around an axis 28 in forward and backward directions, a horizontal arm 24c connected to the vertical arm 24b so as to be rotatable around an axis 29 in upward and downward directions, a wrist 24d connected to the distal end of the horizontal arm 24c so as to be rotatable around an axis 30, and a handling unit 24e attached to the wrist 24d. The handling unit 24e includes three movable fingers, and one of the fingers has two joints 24f and 24g. The number of joints may be one. As long as the handling unit 24e can hold an object to be measured, the handling unit 24e may have any structure instead of the structure including three movable fingers.

The shape of an object is measured using the shape measuring apparatus mounted on the robot apparatus R as follows.

The shape measuring apparatus S, which measures the shape of the object, is moved to the position of the object. This is done by rotating the rotating base 24a, directing the shape measuring apparatus S toward the object to be measured, rotating the vertical arm 24b in the forward or backward direction, rotating the horizontal arm 24c in the upward or downward direction, and extending or contracting an arm.

When the shape measuring apparatus S reaches the position of the object to be measured, the laser 7 emits a laser beam and the shape measuring apparatus measures the shape of the object. Then, the joints 24f and 24g of the three fingers of the handling unit 24e move and hold the object on the basis of the positional information.

Thus, by mounting the shape measuring apparatus S on the robot apparatus R, the shape measuring apparatus S can be easily moved to a desired position. The angle between the object to be measured and the shape measuring apparatus S can be easily set and adjusted, whereby measuring operation can be efficiently performed.

Because the robot apparatus R includes the handling unit 24e for holding the object to be measured, for example, an object that is being conveyed on a conveyer can be handled by measuring the shape of the object using the shape measuring apparatus S and by immediately moving the two joints of the handling unit 24e.

What is claimed is:

1. A shape measuring apparatus comprising:
   a housing including a base and a cover; and
   a laser that emits a laser beam,
   wherein the housing has an open space that is open to the atmosphere and a closed space that is closed to the atmosphere,
   wherein the open space is defined by a laser box provided in the housing and contains the laser, the laser box including an opening and laser attachment holes, the opening being provided in a portion which is not in contact with the closed space, the laser attachment holes extending through walls defining the closed space, the laser attachment holes receiving both ends of the laser, and
   wherein the closed space contains
      a heat generating element mounted on a substrate, and
      a heat conducting sheet that transfers heat generated by the heat generating element to the base,
   wherein a vent hole is formed in a portion of the cover that is in contact with the open space,
   wherein the closed space contains a rotatable mirror that reflects the laser beam, a mirror shaft that supports the mirror, a lens and a camera that detect a shape of an object irradiated with the laser beam emitted from the mirror, and a fan that cools contents in the housing, and wherein a body of the laser, excluding a distal end portion of the laser from which the laser beam is emitted and a proximal end portion of the laser from which a cable extends, is disposed in the open space of the laser box such that the body of the laser has a front side, an upper side, and a lower side that are provided in the open space.

2. The shape measuring apparatus according to claim 1, wherein the base is a heatsink.

3. The shape measuring apparatus according to claim 1, wherein the heat generating element mounted on the substrate is in close contact with the base with the heat conducting sheet therebetween.

4. The shape measuring apparatus according to claim 1, wherein the heat generating element has a rectangular shape with flat side surfaces, and the fan is diagonally disposed on the base so as to blow air at an angle toward the side surfaces of the heat generating element.

5. The shape measuring apparatus according to claim 1, wherein a laser holder for fixing a portion of the laser between the two ends in an axial direction of the laser is attached to an inside of the laser box.

6. The shape measuring apparatus according to claim 5, wherein the laser holder is disposed so as to face the opening.

7. The shape measuring apparatus according to claim 1, wherein a motor shaft of a motor is connected to the mirror shaft, and at least a part of a body of the motor is disposed outside the housing.

8. The shape measuring apparatus according to claim 1, wherein the ends of the laser are fitted within the attachment holes.

9. A robot apparatus comprising:
a fixed unit;
a movable unit disposed on the fixed unit; and
a shape measuring apparatus including
    a housing including a base and a cover, and
    a laser that emits a laser beam,
wherein the housing has an open space that is open to the atmosphere and a closed space that is closed to the atmosphere, wherein the open space is defined by a laser box provided in the housing and contains the laser, the laser box including an opening and laser attachment holes, the opening being provided in a portion which is not in contact with the closed space, the laser attachment holes extending through walls defining the closed space, the laser attachment holes receiving both ends of the laser, and wherein the closed space contains
    a heat generating element mounted on a substrate, and
    a heat conducting sheet that transfers heat generated by the heat generating element to the base, wherein a vent hole is formed in a portion of the cover that is in contact with the open space, wherein the closed space contains a rotatable mirror that reflects the laser beam, a mirror shaft that supports the mirror, a lens and a camera that detect a shape of an object irradiated with the laser beam emitted from the mirror, and a fan that cools contents in the housing, and wherein a body of the laser, excluding a distal end portion of the laser from which the laser beam is emitted and a proximal end portion of the laser from which a cable extends, is disposed in the open space of the laser box such that the body of the laser has a front side, an upper side, and a lower side that are provided in the open space.

10. The robot apparatus according to claim 9, wherein the movable unit includes at least one movable arm and a wrist provided at a distal end of the movable arm, and the shape measuring apparatus is mounted on the wrist.

11. The robot apparatus according to claim 10, wherein the wrist includes a handling unit for holding an object to be measured.

12. The robot apparatus according to claim 11, wherein the handling unit includes at least three movable fingers.

13. The robot apparatus according to claim 12, wherein each of the movable fingers includes at least one joint.

14. The robot apparatus according to claim 9, wherein the ends of the laser are fitted within the attachment holes.

* * * * *